United States Patent [19]

Danzuka et al.

[11] Patent Number: 5,236,482
[45] Date of Patent: Aug. 17, 1993

[54] METHOD FOR PRODUCING GLASS PREFORM FOR OPTICAL FIBER

[75] Inventors: Toshio Danzuka; Masumi Ito; Tatsuhiko Saito; Ichiro Tsuchiya, all of Osaka, Japan

[73] Assignee: Sumitomo Electric Industries, Ltd., Osaka, Japan

[21] Appl. No.: 831,433

[22] Filed: Feb. 5, 1992

[30] Foreign Application Priority Data

Feb. 8, 1991 [JP] Japan .................................. 3-017434

[51] Int. Cl.$^5$ ........................................... C03B 37/023
[52] U.S. Cl. ........................................ 65/3.12; 65/3.11
[58] Field of Search ..................... 65/3.11, 3.12, 4.2, 65/4.21

[56] References Cited

U.S. PATENT DOCUMENTS

| | | | |
|---|---|---|---|
| 4,579,571 | 4/1986 | Hicks | 65/3.12 |
| 4,596,589 | 6/1986 | Perry | 65/3.12 |
| 4,620,861 | 11/1986 | Berkey | 65/3.12 |

FOREIGN PATENT DOCUMENTS

| | | |
|---|---|---|
| 0195407 | 9/1986 | European Pat. Off. |
| 0257587 | 3/1988 | European Pat. Off. |
| 0367871 | 5/1990 | European Pat. Off. |
| 50-149356 | 11/1975 | Japan |
| 54-142222 | 11/1979 | Japan |
| 56-109833 | 8/1981 | Japan |
| 58-125619 | 7/1983 | Japan |
| 63-201025 | 8/1988 | Japan |
| 1-275441 | 11/1989 | Japan |

Primary Examiner—Robert L. Lindsay
Attorney, Agent, or Firm—Cushman, Darby & Cushman

[57] ABSTRACT

A glass preform for use in the fabrication of an optical fiber having a reduced transmission loss is produced by synthesizing a soot preform by a vapor synthesis method and consolidating the soot preform in an electric furnace to obtain a glass preform, wherein an intermediate body consisting of a core portion and an inner part of a cladding portion is consolidated under atmospheric pressure and an outer part of the cladding portion which surrounds a periphery of the intermediated body is consolidated under reduced pressure or in vacuo.

3 Claims, 2 Drawing Sheets

METHOD FOR PRODUCING GLASS PREFORM FOR OPTICAL FIBER

BACKGROUND OF THE INVENTION

1. Field of the Invention

The present invention relates to a method for producing, with a high productivity, a glass preform for use in the fabrication of an optical fiber having a low transmission loss.

2. Description of the Related Art

In the optical fiber field, a deposited mass of glass soot which is synthesized by vapor phase synthesis such as a VAD method or an OVD method is usually consolidated in an electric furnace under atmospheric pressure. In particular, to reduce the transmission loss of the finally fabricated optical fiber, water contained in the soot preform is removed before consolidation. For example, Japanese Patent Kokai Publication No. 14936/1975 discloses a method for dehydration and consolidation of a soot preform in a gas mixture of helium and about 10% by volume of chlorine. In the conventional methods, the soot preform, namely a porous glass preform is generally consolidated under atmospheric pressure.

A method for consolidating the soot body under in vacuo is disclosed in Japanese Patent Kokai Publication No. 201025/1988, which method uses a heating apparatus comprising a vacuum container having a heater and a muffle tube within the heater and heats the soot preform in the muffle tube.

The conventional methods which consolidate the soot preform in an atmosphere of helium or a mixture of helium and a halogen gas under atmospheric pressure have good water-removing ability if contamination of the atmosphere with water or impurities is prevented, and is an excellent method for the production of high purity quartz glass.

Recently, to increase the productivity, a size of the preform has been increased. When a diameter of the preform is increased, bubbles tend to remain in a center part of the preform. To prevent this problem, the consolidation of the large size soot preform should be effected slowly. Therefore, the increase of the productivity of the soot preform does not lead to the increase of the productivity of the transparent glass preform, so that increase of the diameter of the preform is limited.

In the method for consolidating the soot preform in vacuo, since the vacuum container is required to have good sealability and pressure-resistance, it should be made of a metal. But, since the muffle tube is contained in the container, the sealing cannot be complete, so that an outer metal wall is corroded and a metal halide is formed and contaminates the soot preform. Therefore, clean dehydration cannot be achieved.

SUMMARY OF THE INVENTION

The present invention intends to solve the above problems of the conventional methods for the production of a glass preform for use in the fabrication of an optical fiber.

According to the present invention, there is provided a method for producing a glass preform for use in the fabrication of an optical fiber comprising steps of synthesizing a soot preform by a vapor synthesis method and consolidating said soot preform in an electric furnace to obtain a glass preform, wherein an intermediate body consisting of a core portion and an inner part of a cladding portion is consolidated under atmospheric pressure and an outer part of the cladding portion which surrounds a periphery of said intermediated body is consolidated under reduced pressure or in vacuo.

DETAILED DESCRIPTION OF THE DRAWINGS

Figure 1:
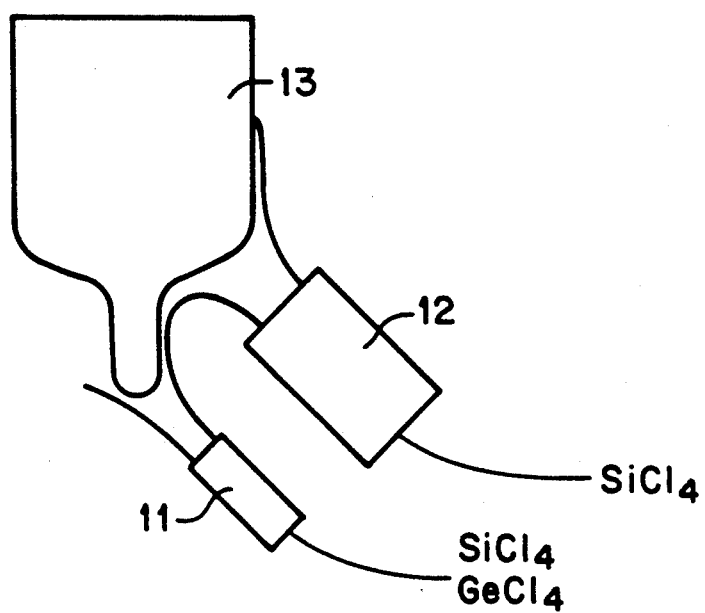
Figure 2:
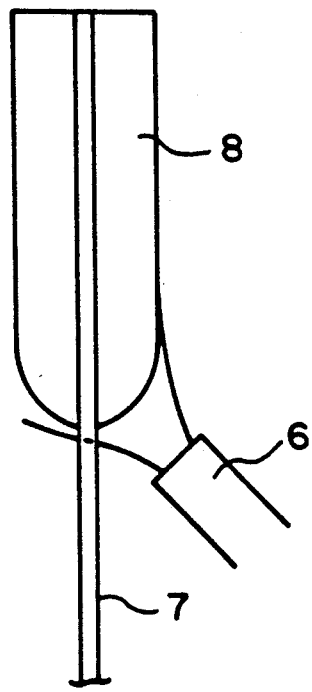
Figure 3:
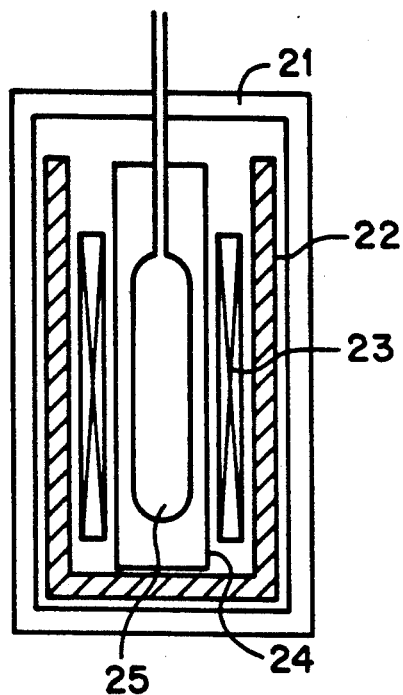
Figure 4:
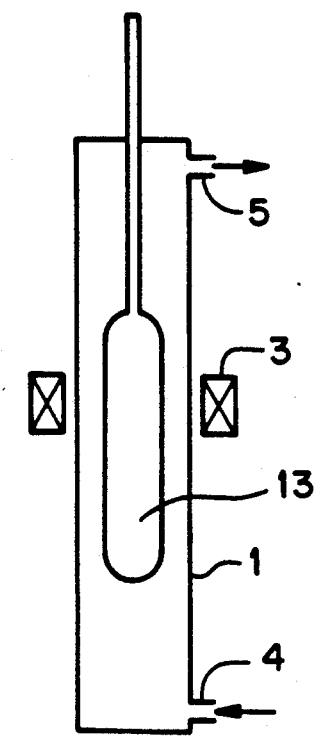

FIG. 1 schematically shows a step for synthesizing an intermediate soot preform by the VAD method, FIG. 2 schematically shows a step for forming an outer part of a cladding portion of a preform on an intermediate body of the preform, FIG. 3 is a cross section of a heating furnace for consolidating the preform under reduced pressure or in vacuo, and FIG. 4 is a cross section of a heating furnace for consolidating the preform under atmospheric pressure.

DETAILED DESCRIPTION OF THE DRAWINGS

The method of the present invention will be explained, by way of example, by making reference to the accompanying drawings.

FIG. 1 schematically shows a step for forming an intermediate soot preform 13 consisting of a core portion and an inner part of a cladding portion by the VAD method using respective burners 11 and 12 by the VAD method. Conditions including raw materials in the VAD method are the same as those in the conventional method. The synthesized intermediate soot preform 13 is introduced in a furnace 1 of FIG. 4 equipped with a heater 3, dehydrated by heating it at a temperature of 1000° to 1100° C. in a mixture of helium and $Cl_2$ introduced through a gas inlet 4 and exited from a gas outlet 5, and then consolidated at a temperature of, for example, 1600° C. in a helium atmosphere to obtain a high quality transparent intermediate glass preform 7 from a light transmitting part of which water is thoroughly removed. The dehydration and consolidation of the preform in the furnace of FIG. 4 are carried out under atmospheric pressure.

Alternatively, the intermediate glass preform 7 can be produced by synthesizing the core portion in the form of a rod and the inner part of the cladding portion in the form of a rod, dehydrating and consolidating them independently, boring the cladding rod, inserting the core rod in the bore of the cladding tube and then collapsing the cladding tube onto the core rod (a rod-in-tube method).

In the next step, as shown in FIG. 2, glass soot 8 for the remaining part of the cladding portion is deposited around the transparent intermediate glass preform 7 with a burner 6. Conditions in this step are again same as those in the conventional method. Then, a composite body 25 consisting of the intermediated glass preform 7 and the outer soot 8 is heated in a vacuum container 21 as shown in FIG. 3, which has a shielding plate 22, a heater 23 and a muffle tube 24 therein.

In the method of the present invention, since the outer part of the cladding portion is consolidated under reduced pressure or in vacuum, for example, a pressure lower than 100 Pa, preferably lower than 10 Pa, for instance, 1 to 10 Pa, gas remaining in the soot 8 is removed. Thereby, the outside heating of the composite 25 having a large diameter with the heater 23 can provide the high quality glass preform for an optical fiber containing no bubble.

Since the outer part of the cladding has little influence on the light transmission, the contamination of this part with the metal or metal halide from the vacuum container 21 has practically no influence on the light transmission of the optical fiber. In view of this fact and light transmission loss, a ratio of an outer diameter of the inner part of the cladding to an outer diameter of the outer part of the cladding is from 0.1:1 to 0.5:1, preferably 0.2:1 to 0.35:1.

PREFERRED EMBODIMENTS OF THE INVENTION

EXAMPLE 1

(a) By the VAD method shown in FIG. 1, a soot preform having a diameter of 120 mm was synthesized. A core portion was synthesized by supplying $GeCl_4$ as a dopant to the burner 11 so that it had a higher refractive index than that of $SiO_2$ synthesized by the burner 12. An amount of $GeCl_4$ was changed according to the intended increase of the refractive index of the core portion.

The synthesized soot preform was dehydrated and consolidated under atmospheric pressure by the furnace of FIG. 4.

The soot preform was dehydrated by traversing it in the furnace at a rate of 8 mm/min. at 1050° C. while flowing helium and $Cl_2$ at flow rates of 15 l/min. and 300 cc/min., respectively in the furnace. The diameter of the preform after dehydration did not change.

Then, the dehydrated soot preform was consolidated by traversing it at a rate of 5 mm/min. in the same furnace at 1610° C. while flowing helium only.

The obtained intermediate preform contained no bubbles therein. A difference of the refractive index between the core portion and the cladding portion was 0.32%. That is, the core portion had a refractive index which is 0.32% higher than that of the cladding made of pure $SiO_2$. A ratio of an outer diameter of the core portion to that of the cladding portion was 0.2 .

(b) The intermediate preform was elongated to an outer diameter of 21 mm, and around this preform, glass soot was deposited by the method shown in FIG. 2. An outer diameter of the deposited soot was 182 mm. Then, the deposited soot was consolidated in the furnace of FIG. 3.

An internal pressure of the furnace 21 was reduced to 2 Pa and the composite 25 was kept in the furnace at 1600° C. for 30 minutes. The obtained glass preform contained no bubbles therein.

The final glass preform was drawn to fabricate an optical fiber having an outer diameter of 125 μm, which had a transmission loss of 0.205 dB/Km with light having a wavelength of 1.55 μm.

EXAMPLE 2

As a core material, a glass soot containing $GeCl_4$ in an amount corresponding to a refractive index different of 0.32% and having an outer diameter of 8 mm was synthesized by the VAD method and dehydrated and consolidated in the same manner as in the step (a) of Example 1 to produce a core portion rod.

In a separate step, a pure quartz soot body having an outer diameter of 145 mm was synthesized, dehydrated and consolidated in the same manner as in the step (a) of Example 1 to obtain a glass rod having an outer diameter of 55 mm. Along its center axis, a bore having a diameter of 9 mm was formed to form a glass tube.

In the bore of the glass tube, the above core portion rod was inserted after elongation, and a composite was heated and collapsed to integrate them together, whereby, an intermediate glass preform having a core/cladding ratio of 0.17 was produced.

Around the intermediate glass preform, glass soot was deposited and consolidated in the same manner as in the step (b) of Example 1 to obtain a transparent glass preform.

The transparent glass preform was drawn to fabricate an optical fiber having an outer diameter of 125 μm, which had a transmission loss of 0.207 dB/Km with a light having a wavelength of 1.55 μm.

We claim:

1. A method for producing a glass preform for use in the fabrication of an optical fiber comprising the steps of:
   synthesizing a soot preform by a vapor synthesis method;
   consolidating said soot preform in an electric furnace, at atmospheric pressure, to obtain an intermediate body glass preform, comprising a core portion surrounded by an inner cladding portion;
   depositing glass soot on said intermediate body preform whereby an outer cladding portion layer is formed; and
   consolidating said deposited soot on said preform under vacuo,
   such that the ratio of diameters of the inner cladding portion to outer cladding portion is in the range of from 0.1:1 to 0.5:1.

2. The method according to claim 1, wherein said intermediate body is produced by a VAD method.

3. The method according to claim 1, wherein said intermediate body is produced by forming a core portion rod, separately forming a cladding portion rod, boring said cladding portion rod, inserting said core portion rod in a bore of said cladding potion rod and then collapsing them to integrate them together.

* * * * *